United States Patent
Pagnanelli (10) Patent No.: US 7,460,662 B2
(45) Date of Patent: Dec. 2, 2008

(54) ISOLATION OF TRANSMIT AND RECEIVE SIGNALS IN FULL-DUPLEX COMMUNICATION SYSTEMS

(75) Inventor: Chris Pagnanelli, Huntington Beach, CA (US)

(73) Assignee: Solarflare Communications, Inc., Irvine, CA (US)

( * ) Notice: Subject to any disclaimer, the term of this patent is extended or adjusted under 35 U.S.C. 154(b) by 517 days.

(21) Appl. No.: 11/002,953

(22) Filed: Dec. 2, 2004

(65) Prior Publication Data

US 2006/0133598 A1 Jun. 22, 2006

(51) Int. Cl.
*H04M 1/00* (2006.01)
(52) U.S. Cl. ........................ 379/402
(58) Field of Classification Search .................. 379/402
See application file for complete search history.

(56) References Cited

U.S. PATENT DOCUMENTS 4,607,787 A * 8/1986 Rogers, III .................. 236/11
7,050,574 B1 * 5/2006 Vareljian .................... 379/402
2001/0016021 A1 * 8/2001 Chan .......................... 375/346

* cited by examiner

*Primary Examiner*—Ramnandan Singh
(74) *Attorney, Agent, or Firm*—Weide & Miller, Ltd.

(57) ABSTRACT

A method and apparatus for isolating transmit and receive signals in a communication system utilizing a common channel for both incoming and outgoing signals. In one embodiment a tuned hybrid or isolation circuit is provided with a high-frequency pre-emphasis response. The tuned hybrid rejects the transmit signal from the receive port and is capable of isolating the low power receive signal. One or more filters within the hybrid provide the desired levels of attenuation and frequency specific processing. Outgoing transmit signals encounter minimal attenuation thereby reducing overall transmit power requirements while receive signals are isolated. The tuned hybrid may be configured with an all-pass network consisting of an attenuator and a delay element. Both of these devices or elements maybe tuned to tailor the frequency response to the channel.

23 Claims, 10 Drawing Sheets

ISOLATION OF TRANSMIT AND RECEIVE SIGNALS IN FULL-DUPLEX COMMUNICATION SYSTEMS

FIELD OF THE INVENTION

The invention relates to communication devices and, in particular, to a method and apparatus for isolating transmitted and received signals.

RELATED ART

Modern communication systems often utilize a single channel to simultaneously transmit and receive data. This process is often referred to as full-duplex operation. Full-duplex operation provides the advantage of maximizing channel utilization because data may be simultaneously transmitted and received over the same path. The channel may comprise one or more conductors or paths, that each may simultaneously carry transmit and receive signals.

While full-duplex operation provides the advantage of simultaneous use of the channel for transmission and reception, full-duplex operation must acquire a low level incoming (receive) signal, while concurrently sending the outgoing (transmit) signal at an appropriate power level. As can be appreciated and is understood by one of ordinary skill in the art, there are numerous challenges associated with isolating a time varying receive signal on a channel that also simultaneously carries a time varying transmit signal. This challenge is made more difficult due to the fact that at a transceiver the power level of the incoming signal may be one or more orders of magnitude less than the power level of the outgoing signal. Thus, absent adequate isolation or cancellation of the transmit signal, it is not possible to accurately acquire and isolate the receive signal, which has been greatly attenuated due to its passage through the channel.

Figure 1:
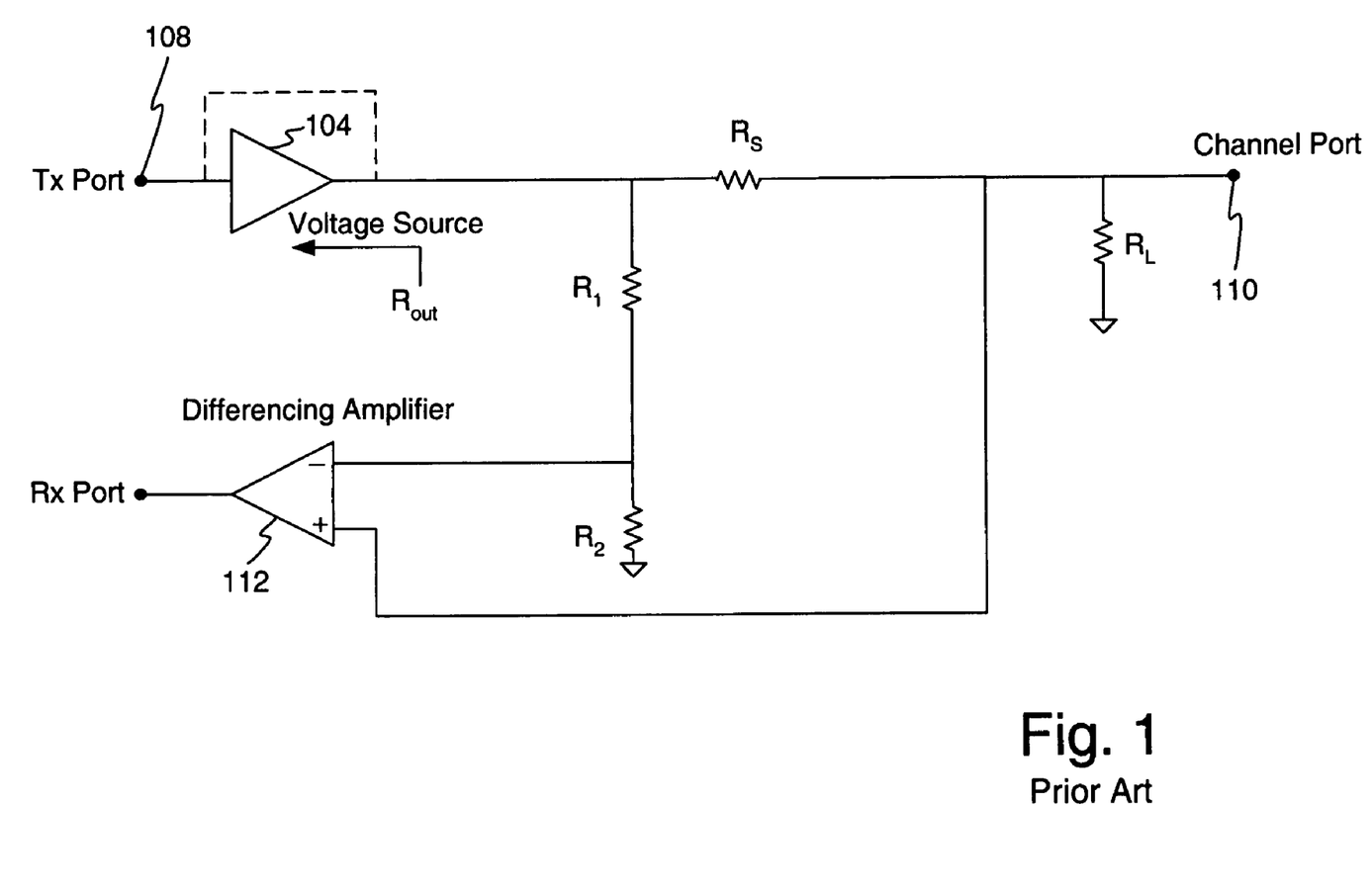
FIG. 1 illustrates a block diagram of a prior art hybrid configuration.

In prior art systems, a number of various devices were utilized to provide this isolation between the transmitter and the receiver, both of which connect to the shared channel. For example, certain prior art embodiments utilized a standard telephone compromise hybrid configured with a voltage source and resistive bridge as is shown in FIG. 1. As shown, a voltage source 104 receives an outgoing transmit signal on a transmit port 108. The voltage source 104 has low output impedance, shown as $R_{out}$. The output of the voltage source 104 connects to resistors $R_S$ and $R_1$. The opposing terminal of resistor $R_S$ connects to a channel port 110 and a positive input terminal of a low noise amplifier 112, which is configured for a voltage differencing operation. The negative input terminal of the amplifier 112 connects to the opposing terminal of resistor $R_1$ and through resistor $R_2$ to ground. A resistor $R_L$ represents the impedance of the channel.

In this circuit, a signal transmitted by the voltage source 104 is provided to the channel through a resistor $R_S$. The amount of attenuation occurring as a result of $R_S$ is determined by the channel impedance $R_L$ and is defined as the loss in the outgoing path of the hybrid. Receive signals are represented as the difference between the positive and negative input terminals of the differencing amplifier 112. The operation of a hybrid is generally understood and hence, not discussed in detail beyond the following. To isolate the transmit signal from the receive signal, the circuit directs the transmit signal to resistors $R_S$ and $R_1$. The circuit configuration of this prior art hybrid directs the transmit signal to both the positive and negative input terminals of the differencing amplifier 112. By properly selecting the values for $R_1$ and $R_2$, generally equal transmit signal levels are provided to the inputs of the differencing amplifier thereby canceling the transmit signal. This in turn removes the transmit signal from the receive signal.

With regard to the receive signal, it is provided directly to the positive input of the differencing amplifier, with resistor $R_S$ providing a termination impedance in series with $R_{out}$. The voltage source 104 appears as an AC virtual ground to the incoming receive signal, and consequently, no receive signal appears at the negative input of the differencing amplifier 112. While this configuration proved satisfactory for prior art systems and applications, its utility in wideband communication systems is hindered by the bandwidth limitations of the voltage source 104. In one embodiment, the system shown in FIG. 1, the voltage source 104 must be cable of operating at frequencies many times greater than the bandwidth of the incoming signal. In particular, the output impedance of the voltage source 104 starts to increase at frequencies many times lower than the bandwidth of the voltage source thereby impeding circuit operation. High-frequency operation may require use of an ultra-high bandwidth voltage source, with up to potentially 10 times the bandwidth of the incoming signal, and use of such a device is inefficient with respect to power dissipation and cost.

Other proposed solutions include use of a diplexer, a replica hybrid, or a directional device, such as an active or passive circulator, power splitter, or directional coupler. All of these devices suffer from drawbacks or limitations that make them disadvantageous for wideband isolation of transmit and receive signals.

For example, a replica hybrid circuit, is similar to the embodiment shown in FIG. 1, except it employs two power sources: a primary power source that generates the outgoing signal and a secondary power source that generates a replica of the transmit signal used to remove the outgoing signal from the receive signal. If the noise and distortion characteristics of the replica signal do not match the noise and distortion characteristics of the primary outgoing signal, then this approach suffers from an unacceptable level of noise and distortion at the output of the amplifier 112. This approach generally requires power sources that have very low distortion and very low noise because distortion and noise from the primary power source does not perfectly match the distortion and noise of the replica power source, and consequently, transmit noise and distortion are not significantly attenuated at the differencing amplifier output.

Diplexers are likewise not well suited to wideband applications. A diplexer enables full-duplex operation over a single channel by separating the channel into frequency bands for exclusive use by the incoming and outgoing signals. Using a diplexer can provide adequate isolation if high-order high pass and low-pass filters are used to separate the incoming and outgoing signals, but because certain portions of the channel bandwidth are reserved for incoming signals and certain portions of the channel bandwidth are reserved for outgoing signals, the full capacity of the channel is not utilized. This is an unacceptable solution for a wide-bandwidth communication system designed to meet high data transmit rate requirements over a narrowband channel.

With regard to directional devices, such as active or passive circulators, power splitters, or directional couplers, such devices may be configured to provide adequate isolation, but suffer from the drawback of an unacceptably large degree of incoming signal or outgoing signal attenuation, an inadequate degree of wideband isolation, or a combination of these drawbacks. The directional device may be configured to provide adequate wideband isolation, but generally only at the expense of incoming signal attenuation, outgoing signal attenuation, or both. Alternatively, if configured to minimize attenuation of incoming or outgoing signals, such as a passive circulator, adequate isolation can only be realized over a narrow band of operation. Thus, use of directional devices for wideband, high data rate applications over bandlimited channels is generally not feasible.

As a result, a need continues to exist in the art for a method and apparatus to isolate incoming and outgoing wideband signals that share a common channel. The method and apparatus disclosed herein provides a solution for this need.

SUMMARY

To overcome the drawbacks of the prior art and provide additional benefits and advantages, a method for isolating a receive signal from a channel also carrying a transmit signal is disclosed. This exemplary method comprises receiving an incoming signal from a channel at the isolation circuit and also receiving an outgoing signal at the isolation circuit, such that the outgoing signal is to be sent over the channel. This method also filters the outgoing signal with a first filter, to create a first filtered outgoing signal, and filters the outgoing signal with a second filter, to create a second filtered outgoing signal. The method provides the first filtered outgoing signal and the second filtered outgoing signal to the inputs of a differencing amplifier. Finally, the method filters the incoming signal with the first filter and the second filter to create a filtered incoming signal. Then the method provides the filtered incoming signal and the incoming signal to the inputs of the differencing amplifier, such that the first filtered outgoing signal and the second filtered outgoing signal cancel in the differencing amplifier and the output of the differencing amplifier is a filtered version of the incoming signal.

It may be desired to have the first filter and the second filter have a generally identical frequency responses and the filtering may comprise phase shifting and attenuating one or more signals. In one application, the channel comprises one or more twisted pair conductors. In one embodiment the first filter and the second filter are configured to generate an all-pass (i.e., flat magnitude) frequency response for the isolation circuit.

Also disclosed herein is a method for isolating a transmit port and a receive port to maintain a desired level of electrical isolation between a signal on the transmit port and an incoming signal received on the receive port in a shared channel environment. In one example embodiment this method comprises receiving an incoming signal at a channel node from a channel and providing an outgoing signal to a transmit port. The method processes the incoming signal to thereby produce attenuation and phase shifting of the incoming signal, to thereby create a processed incoming signal. The method also processes the outgoing signal to generate two or more generally equal outgoing signals. The method provides the processed incoming signal and the incoming signal to a differencing device, and also provides the two or more generally equally processed outgoing signals to a differencing device, such that the generally equal outgoing signals cancel in the differencing device and the differencing device outputs the incoming signal.

In one variation, the differencing device comprises a differencing amplifier. It is contemplated that the processing of the outgoing signal may comprise performing first processing on the outgoing signal and performing second processing on the outgoing signal. The processing may be performed by one or more filters and at least one of the one or more filters may comprise an attenuator and a delay.

According to the teachings contained herein, in one example embodiment the isolation circuit comprises a channel port, a transmit port, and a receive port; and a first filter and a second filter, such that the first filter connects to the channel port. This embodiment further comprises a driver amplifier connected to the transmit port, the first filter, and the second filter, and a differencing junction connected to the receive port, the channel port, and the second filter.

The isolation circuit may further comprise a termination impedance, connected to the second filter, configured to match the impedance of the channel. In addition, the first filter and the second filter may each comprise a delay and an attenuator. By way of example, the isolation circuit may have a lead-lag frequency response that produces high-frequency pre-emphasis.

In another example embodiment a signal isolation unit is utilized to isolate the receive signal and provide the transmit signal at a desired or maximum power level to the channel. This example embodiment comprises a channel port configured to connect to a channel, a transmit port configured to connect to a transmitter, and a receive port configured to connect to a receiver. Also associated with this embodiment is a differencing amplifier comprising an output connected to the receiver port, and a first input connected to the channel port and a second input connected to a second filter. The isolation unit also comprises a driver amplifier, or any signal source, that has an input connected to the transmit port and an output connected to the first filter and a second filter, such that the first filter connects to the channel port and the first filter and the second filter have generally similar transfer functions.

It is contemplated that the transfer function of the signal isolation unit is frequency dependant and that the transfer function of the signal isolation unit is optimized for the communications channel. In one embodiment the transfer function of the signal isolation unit is an all-pass function. This unit may further comprise a termination impedance. In one embodiment the signal isolation unit is configured in a differential mode. In one mode of operation, each input of the differencing amplifier receives a generally identical filtered version of a signal received on the transmit port.

Also disclosed herein is an isolation circuit comprising a first port, a second port and a third port. The first port is configured to connect to a channel while a second port is configured to connect to a transmitter and a third port configured to connect to a receiver. The isolation circuit also comprises at least one filter that is configured to filter a receive signal traveling from the channel to the receive port and filter a transmit signal traveling from the second port to the channel. In this embodiment the isolation circuit is configured to isolate the receive signal while rejecting the transmit signal from the third port.

In one variation, at least one filter comprises at least one delay and at least one attenuator. In a differential mode configuration, an isolation circuit may be associated with each differential path. In one embodiment a termination impedance is provided which has an impedance value related to the channel impedance.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 2:
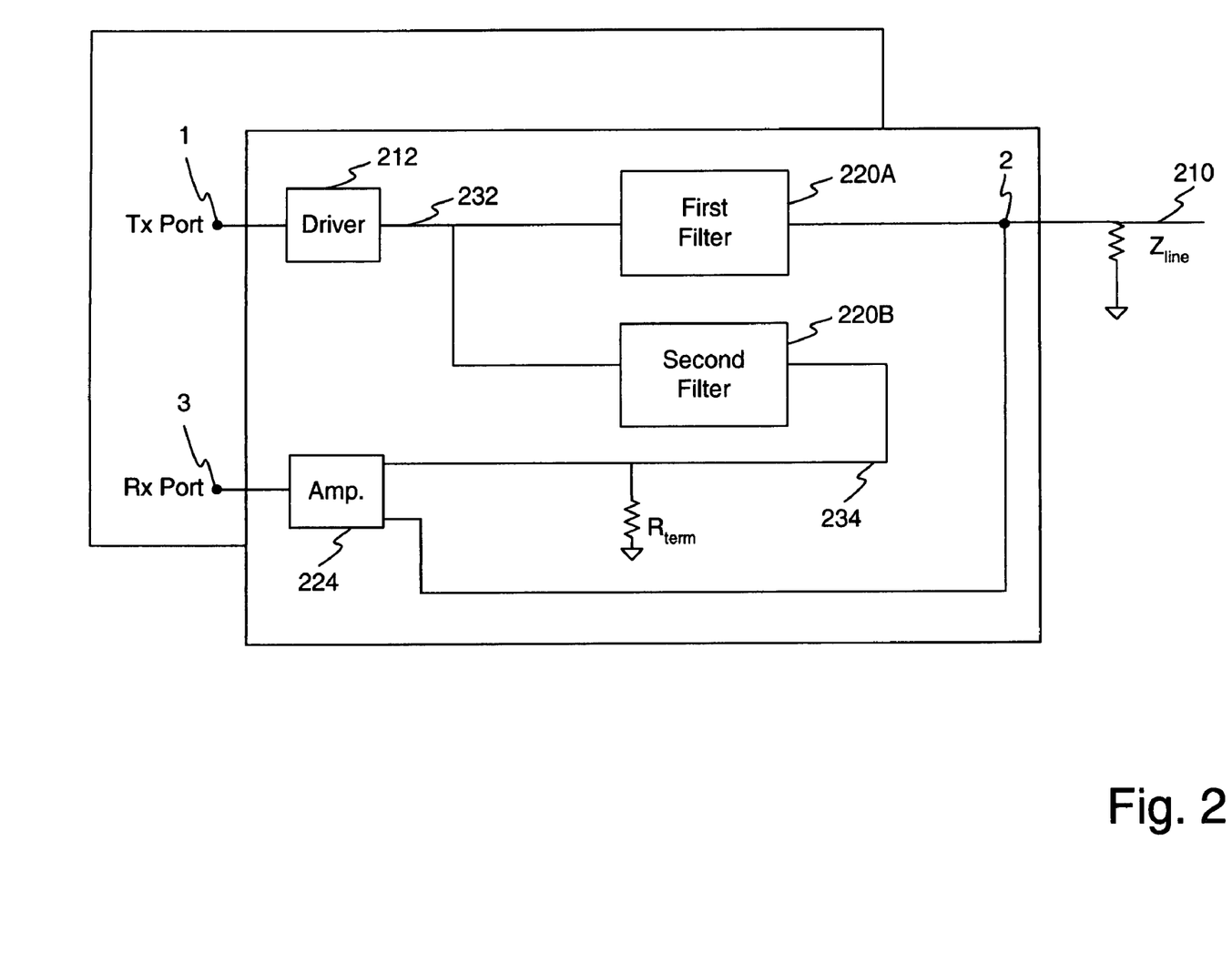
FIG. 2 illustrates a block diagram of an example embodiment of a tuned isolation circuit.

FIG. 2 illustrates a block diagram of an example embodiment of a tuned isolation circuit. As shown, a transmit port at node 1 is configured to receive an outgoing signal from a communication device or other source. The outgoing signal is to be transmitted over a channel 210 shown as having a line impedance, $Z_{line}$.

A receive port at a node 3 is configured to receive and provide incoming signals to a communication device or other signal receiving apparatus that may connect to node 3. The term communication device is defined herein to mean any system or apparatus configured to communicate information or data between two locations. It is contemplated that the communication device may operate in a full-duplex mode thereby benefiting from the tuned isolation circuit as described herein. The channel may comprise any element or medium configured to convey information or data, such as, but not limited to, metallic conductors, twisted pair, coaxial cable, CAT5 or CAT6 cabling or any variation, such as, but not limited to, CAT5e, wireless or free space channel, waveguide, single-ended or differential transmission line, or fiber optic cable. Because the method and apparatus described herein may operate with any type channel, the channel may comprise any other channel as would be understood by one of ordinary skill in the art and the claims that follow are not limited to a particular channel.

As can be appreciated, it may be necessary to isolate the transmit port at node 1 from the receive port at node 3 so that incoming signals from the channel 210 are provided to the receive port at node 3 with minimum attenuation, while signals transmitted from the transmit port 204 are provided with maximum power transferred to the channel, without overpowering or interfering with the signal on the receive port. Accordingly, the embodiment shown in FIG. 2 utilizes a driver amplifier 212 to connect to the transmit port at node 1. The driver amplifier 212 may comprise a current output driver, a voltage output driver, matched-impedance driver, or any other device capable of receiving and reproducing a transmit signal received on node 1. The driver amplifier 212 may be configured with or without gain, and with or without feedback.

The output of the driver amplifier 212 connects to a first filter 220A and a second filter to 220B. The filters 220A, 220B may comprise any type filter configured to perform as described herein. It is contemplated that the filters 220A, 220B may comprise analog filters, digital filters, or a combination of both. In one embodiment, the filters 220A, 220B are configured to attenuate a signal and perform frequency specific modification or manipulation of a signal's phase. It is contemplated that the filters 220A, 220B are bidirectional thereby functioning upon a signal regardless of the direction in which a signal passes therethrough.

In one embodiment, the filters 220A, 220B are configured to have identical transfer functions, although in other embodiments it is contemplated that the filters could be configured differently. Although shown as single filters 220A, 220B, the first filter 220A may be considered as representing the transfer function between node 232 and node 2, while the second filter 220B represents the transfer function between node 232 and node 234. Thus, the response of the node itself and the signal path between the nodes is taken into consideration when arriving at the transfer function for filters 220A, 220B.

The output of the first filter 220A connects to the node 2, which in this configuration comprises the channel. Node 2 also connects to an input of a differencing amplifier 224. The output of the second filter 220B connects to ground through a termination impedance $R_{term}$ and to a second input of the differencing amplifier 224. Although shown as a single resistor, the termination impedance may be considered as representing any arbitrary real or reactive impedance network, implemented as discrete components or distributed elements; or synthesized using feedback methods or adaptive methods. The output of the differencing amplifier at node 3 connects to or comprises the receive port of a communication device.

Figure 4:
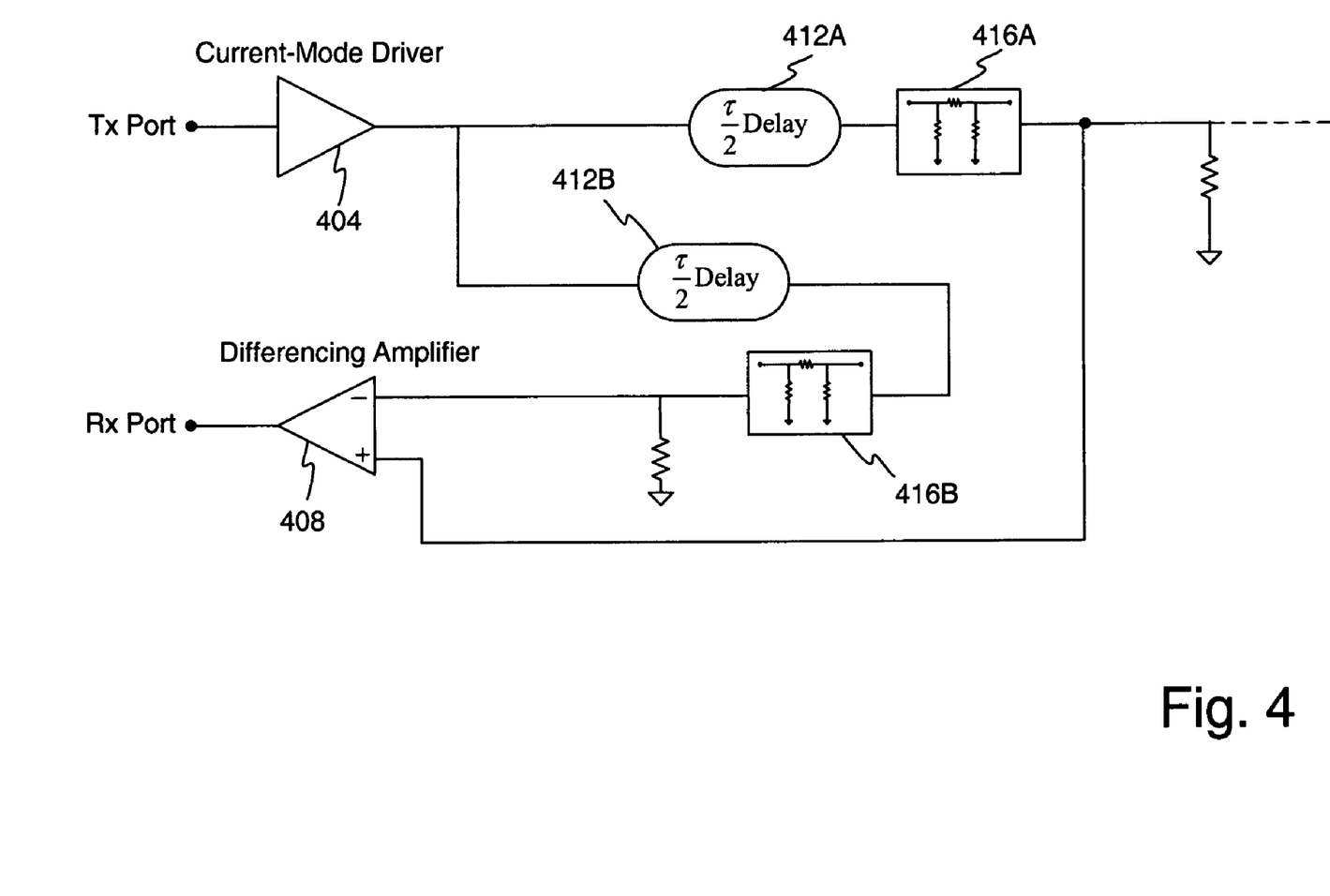
FIG. 4 illustrates a block diagram of an alternative example embodiment of a tuned isolation circuit.
Figure 5A:
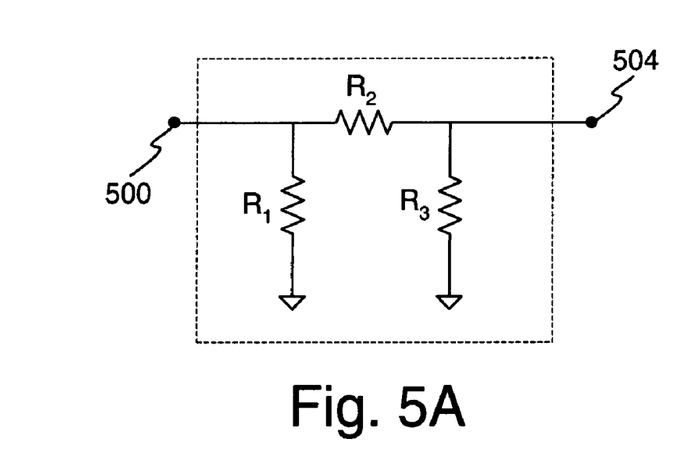
FIGS. 5A and 5B illustrates example embodiments of attenuators.
Figure 5B:
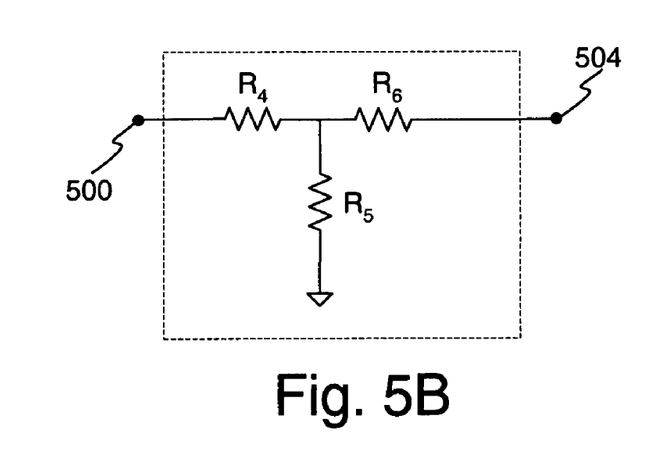

During operation, the outgoing signals are output from node 1 for transmission over the channel 210. Incoming signals are received on node 2, isolated, and provided as an output on node 3. Removal of the transmit signal from the incoming signal and isolation of the incoming signal from the transmit port occurs to achieve desired operation. Because of the operation of the embodiments shown in FIGS. 3-5 is generally similar, a detailed discussion of operation is provided below in conjunction with FIGS. 6-7.

Figure 3:
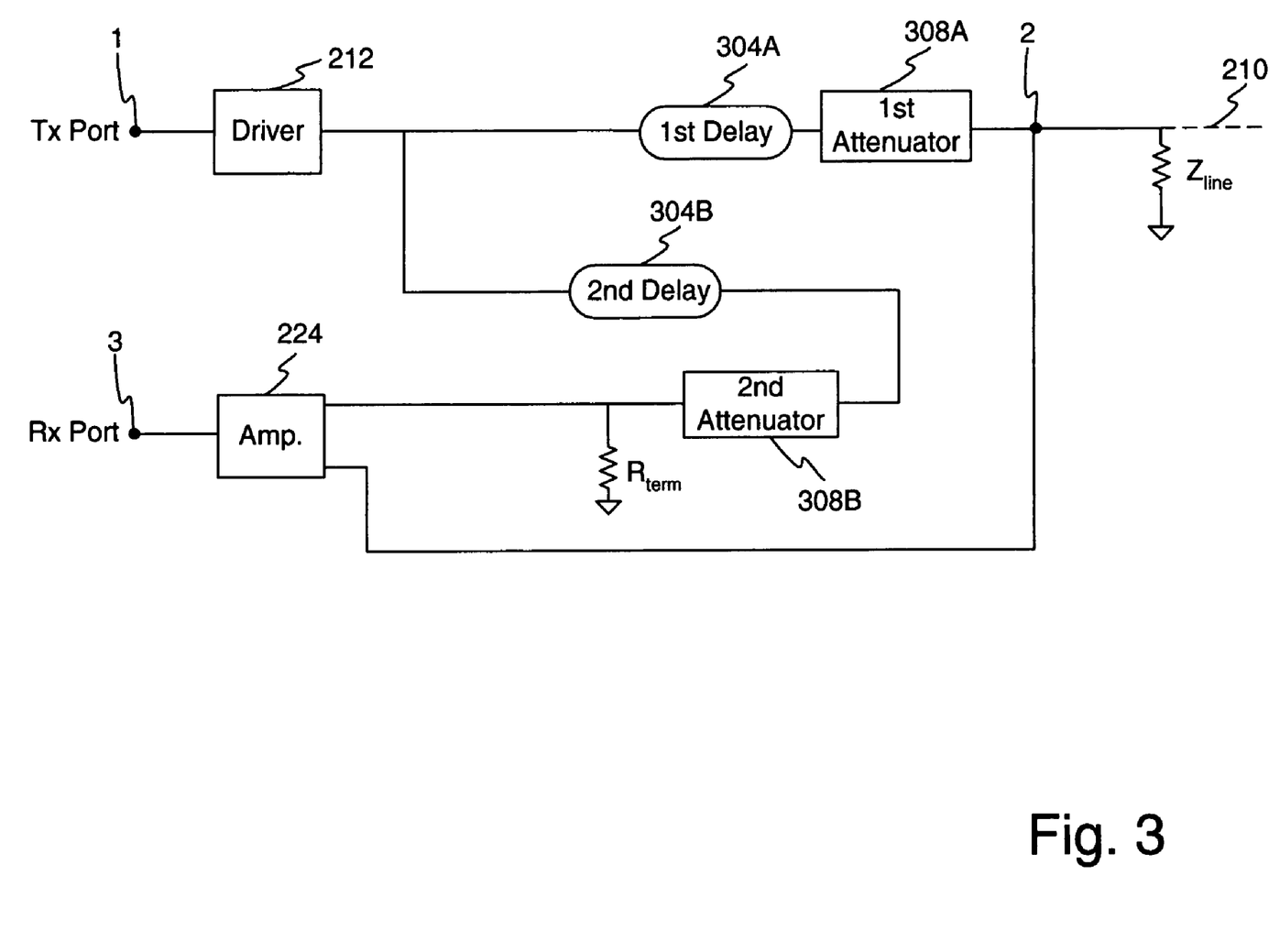
FIG. 3 illustrates a block diagram of an example embodiment of a tuned circuit.

FIG. 3 illustrates an example embodiment of a tuned isolation circuit. This is but one example embodiment and as such, the claims that follow are not limited to this particular configuration. As compared to FIG. 2, identical elements are identified with identical reference numerals and the focus of this discussion is on the aspects of FIG. 3 that are different from that shown in FIG. 2. In this example embodiment, the output of the signal source 212 connects to a first and second delay 304A, 304B as shown. The delay 304 may introduce any amount of delay but the amount of delay is dependant upon the desired frequency affect on the signal passing there through. The delays 304 may comprise any form or type of delay comprising, but not limited to, a tapped delay line, a coaxial cable delay, single-ended or differential transmission lines, a lumped element delay, or a surface acoustic wave delay. The delay 304 may comprise a discrete element or be configured as part of the circuit or part of the printed circuit board.

The opposing terminal of first delay 304A connects to a first attenuator 308A while the opposing side of the second delay 304B connects to a second attenuator 308B. The opposing terminal of the second attenuator 308A connects to node 2 while the opposing terminal of the second attenuator 308B connects to the differencing amplifier 224 and the termination impedance $R_{term}$. The attenuators 308 may comprise any device configured to attenuate a signal passing there through. In the embodiment of FIG. 3, each attenuator provides an amount of attenuation equivalent to the square root of $1/\alpha$, where the value $\alpha$ may be fixed or variable and is selected to achieve a desired receive signal transfer function for the tuned isolation circuit.

It is contemplated that the delays 304 and the attenuators 308, may be configured as a filter, and may comprise active elements, passive elements or a combination of both. In other embodiments, the attenuators 308 may comprise reactive components, or semiconductor devices such as pin diodes, switched capacitors, or bidirectional amplifiers.

FIG. 4 illustrates an example embodiment of an example implementation of the tuned isolation circuit of FIG. 3. This is but one example embodiment and as such, the claims that follow are not limited to this particular configuration. As compared to FIG. 3, identical elements are identified with identical reference numerals and the focus of this discussion is on the aspects of FIG. 4 that are different from that shown in FIG. 3. In this example implementation, the driver amplifier comprises a current output amplifier 404 while the receive amplifier is configured as a differencing low-noise amplifier 408. The delays comprise similarly configured delays 412A, 412B each of which are configured to provide ½ tau ($\tau$) delay, where $\tau$ comprises a baud period. The attenuators 416A, 416B comprise resistive pi type attenuators but in other embodiments the attenuators may comprise any other type of attenuator.

FIG. 5A illustrates an example embodiment of an attenuator. As shown, a first node 500 and a second node 504 provide electrical access to the attenuator. A resistor $R_1$ and $R_2$ connect to the first node 500. The opposing terminal of resistor $R_1$ connects to ground while the opposing terminal of resistor $R_2$ connects to node 504 and resistor $R_3$. The opposing terminal of resistor $R_3$ connects to ground. The values of resistors $R_1$, $R_2$, $R_3$ are selected to achieve the desired level of attenuation.

FIG. 5B is similar to the configuration of FIG. 5A, but the resistors are configured in a T-shaped configuration. As shown, resistor $R_4$ connects to node 500. The opposing terminal of resistor $R_4$ connects to resistors $R_5$ and $R_6$. The opposing terminal of $R_5$ connects to ground while the opposing terminal of resistor $R_6$ connects to node 504. The values of resistors $R_4$, $R_5$, and $R_6$ are selected to achieve the desired level of attenuation.

In other embodiments, attenuators may be configured using any device or element, including, but not limited to, resistors, capacitors, and inductors. Passive or active devices may be used. It is further contemplated that the attenuator may comprise pin diodes, switched capacitors, or variable or fixed gain bi-directional amplifiers.

Transmit Signal Rejection

Figure 6:
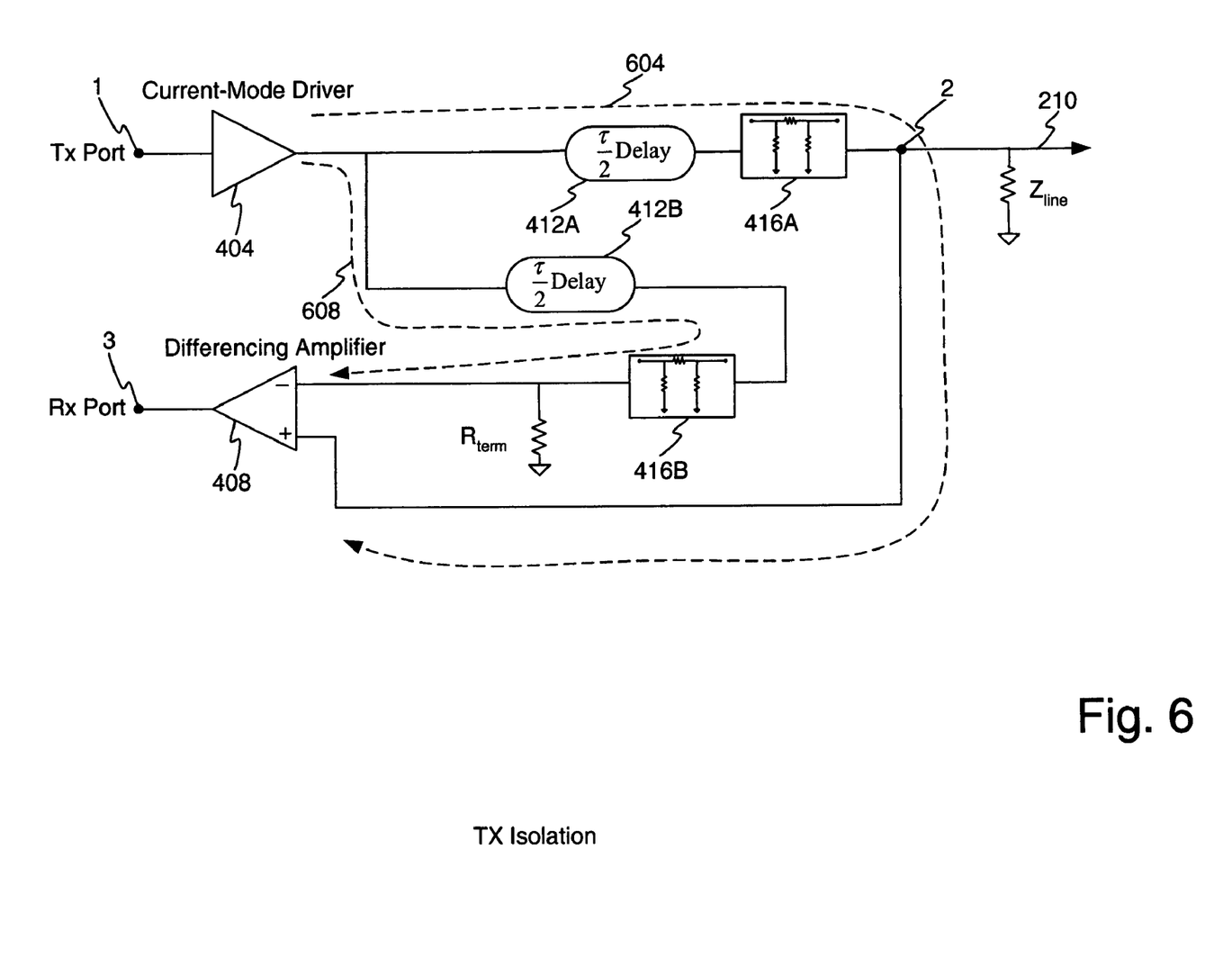
FIG. 6 illustrates an example method of transmit signal rejection.

Turning now to the operation of the tuned isolation circuit as described herein, an example implementation is provided in FIG. 6 for purposes of understanding. Discussed is rejection from the receive port, by a tuned hybrid, of an outgoing transmit signal. The paths 604, 608 taken by an outgoing transmit signal are shown in FIG. 6 with dashed lines. As shown, the transmit signal is output from the current mode driver 404 and proceeds along path 604 and path 608. Each path is now discussed.

Node 1 to Node 2

An outgoing transmit signal traverses along path 604 from node 1 to node 2, encountering isolation elements 412A and 416A before arriving at the channel 210. The outgoing transmit signal is not significantly altered by the isolation elements 412A and 416A, which form an all-pass (i.e. flat magnitude) network. The delay element 412A produces a delay of $\tau/2$ seconds and the attenuation element 416A produces an attenuation of $10 \cdot \log(1/\alpha)$ dB. As a result, the tuned hybrid attenuates the signal that is transmitted from the transmitter by a value that is dependant on the attenuation factor $\alpha$. Although the value for a may comprise any value, it is generally desired for the attenuation factor $\alpha$ to be large to reduce the amount of attenuation applied to the transmit signal. The amount of attenuation is dependant on $\alpha$ and as such, the level of attenuation may be made to be less than prior art embodiments by selecting a higher value of $\alpha$. If, in one embodiment, $\alpha$ equals 0.75, then the tuned hybrid attenuates the transmit signal by about 1.25 dB. This is an improvement over prior art hybrids, when considered in view of the other performance characteristics as defined herein. The relation between different $\alpha$ values on circuit performance is discussed below in more detail in connection with FIG. 9.

For the example embodiment shown in FIG. 6, the complete transfer function $H_{21}$, between Node 1 and Node 2, may be written as follows.

$$H_{21}(s) = V_2(s)/I_1(s) = \sqrt{\alpha} \cdot e^{-s\tau/2}.$$

Node 1 to Node 3

With regard to path 604, the transmit signal encounters the delay element 412A and the attenuation element 416A, as the signal traverses from Node 1 to the positive terminal of the differencing amplifier 408. In the example embodiment, delay element 412A produces a delay of $\tau/2$ seconds and attenuation element 416A produces an attenuation of $10 \cdot \log(1/\alpha)$. With regard to path 608, the transmit signal encounters the delay 412B and attenuator 416B, as the signal traverses from Node 1 to the negative terminal of the differencing amplifier 408. In the example embodiment, delay element 412B produces a delay of $\tau/2$ seconds and attenuation element 416B produces an attenuation of $10 \cdot \log(1/\alpha)$. In other embodiments, other amounts of delay and/or attenuation may be provided.

The delay elements 412A and 412B and the attenuation elements 416A and 416B are matched. Thus, provided the line impedance $Z_{line}$ and the termination impedance $R_{term}$ are also matched, the transfer functions at each input to the differencing amplifier 408 are identical as seen by a signal on path 704 and a signal on path 708. As a result, the transmit signal with a generally identical amount of delay and attenuation is presented to both inputs of the differencing amplifier 408. By definition, the differencing amplifier outputs the difference between its inputs thereby resulting in rejection of the transmit signal at node 3.

For the example embodiment shown in FIG. 6, the complete transfer function $H_{31}$, between Node 1 and Node 3, may be written as follows.

$$H_{31}(s) = V_3(s)/I_1(s) = \sqrt{\alpha} \cdot e^{-s\tau/2} \cdot (Z_{line}(s) - R_{term}(s)).$$

The transfer function of $H_{31}$ represents the rejection capability of the tuned hybrid as determined by the impedance match between the termination resistor $R_{term}$ and channel impedance $Z_{line}$. If $R_{term}$ and $Z_{line}$ are perfectly matched, the differencing amplifier results in complete rejection of the transmit signal at node 3. In other embodiments, complete rejection may not occur, but the degree of isolation between the transmit port at node 1 and the receive port at node 3 is sufficient to adequately reduce the transmit signal on the receive port at node 3 to enable accurate detection and decoding of an incoming receive signal.

Receive Signal Isolation

Figure 7:
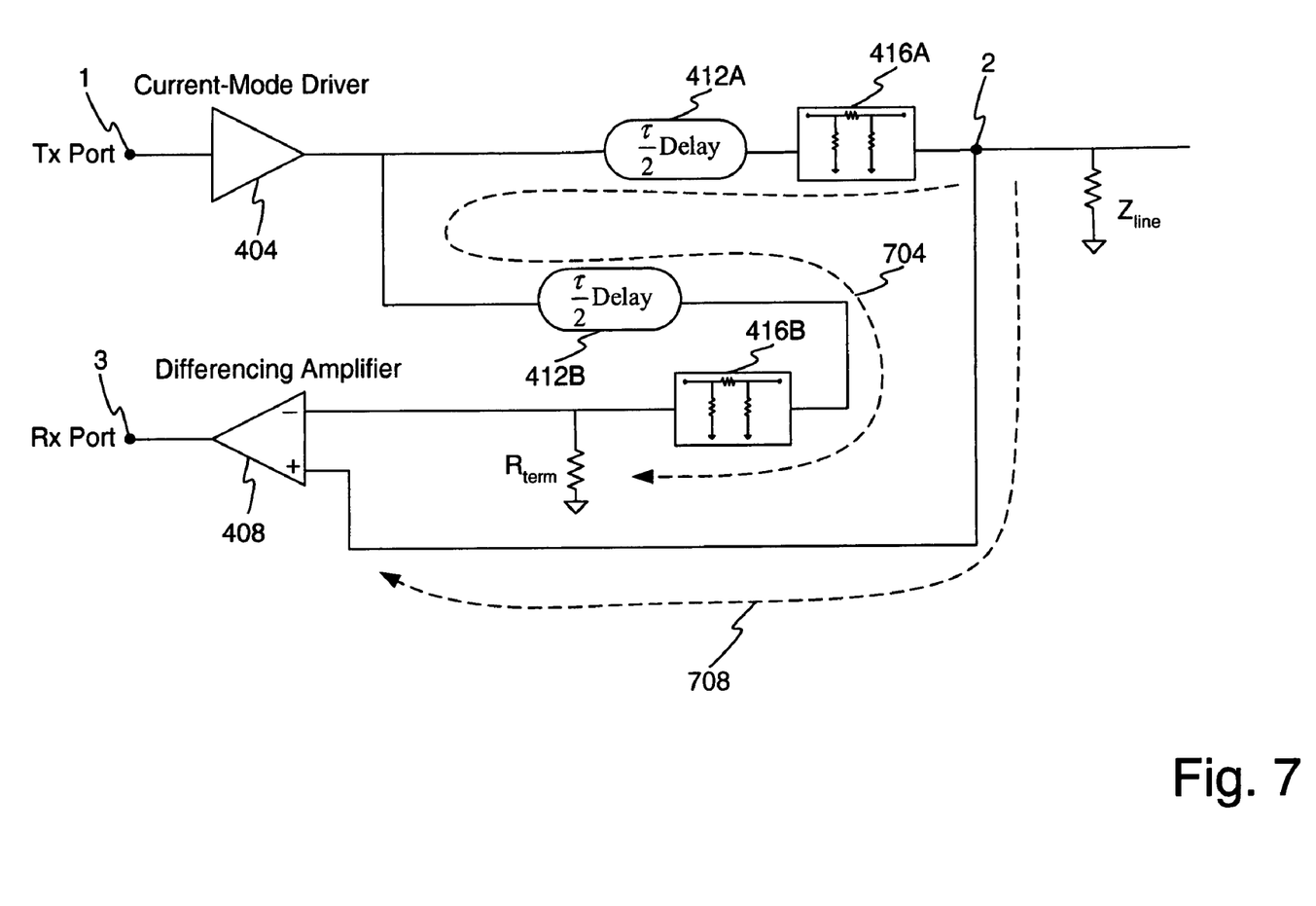
FIG. 7 illustrates an example method of isolating a receive signal.

Turning now to FIG. 7, a block diagram is provided to aid in a discussion of the operation of an example implementation in response to a receive signal. The paths 704, 708 taken by an incoming signal are shown in FIG. 7 with dashed lines. As can be seen, a signal received at the channel node 2 proceeds along paths 704 and 708.

Node 2 to Node 3

A signal on path 708 passes directly to the positive terminal of a low-noise differencing amplifier 408. The transfer function of this path is unity (1) and, as such, a signal on path 708 is not attenuated or delayed.

A signal on path 704 encounters the attenuator 416A, the delay 412A, the output impedance of the current-mode driver 404, the delay 412B, and the attenuator 416B before arriving at the negative terminal of the differencing amplifier 408. In this embodiment, the current-output driver 404 possesses a high output impedance, and therefore, does not affect the signal on path 704. Thus, all of the signal may be assumed as proceeding to the lower path through elements 412B, 416B, subject to the delay and attenuation of these elements 412B, 416B and then into the negative terminal of the differencing amplifier.

The termination resistor $R_{term}$ terminates the incoming signal and in the embodiment shown in FIG. 6 is selected to match the resistance or impedance of the channel $Z_{line}$. In another embodiment, the value of $R_{term}$ may be any real value, or a network of real and reactive impedances. The incoming signal should be properly terminated as it passes along path 704 if the terminating resistor $R_{term}$ is matched to the line.

Mathematically the transfer function from node 2 to the negative input terminal of the differencing amplifier 408 may be written as follows.

$$H_{\_Term32}(s) = V_2(s)/V_-(s) = \sqrt{\alpha} \cdot e^{-s\tau/2} \cdot e^{-s\tau/2} \cdot \sqrt{\alpha}$$

that may also be expressed as:

$$H_{\_Term32}(s) = \alpha \cdot e^{-s\tau}$$

As a result, the receive transfer function $H_{32}$ from node 2 to node 3 may be written as follows.

$$H_{32}(s) = V_3(s)/V_2(s) = 1 - \alpha \cdot e^{-s\tau}$$

The receive transfer function of $H_{32}$ has the effect of a high-pass channel equalization filter while the transfer function $H_{31}$ represents the rejection capability of the tuned hybrid as determined by the impedance match between the termination resistor $R_{term}$ and channel impedance $Z_{line}$.

The receive transfer function applied to the incoming signal is thus represented by $H_{32}$ because the signal on path 708 is generally not filtered at all, while the signal on path 704 is filtered by elements 412, 416 to produce a desirable overall response. In this particular exemplary embodiment, this comprises $20 \cdot \log(1/\alpha)$ dB of attenuation and $\tau$ seconds of delay between these two paths. The resulting output from the differencing amplifier 408 comprises the filtered receive signal and some residual amount of transmit signal determined by the transfer function $H_{31}$. In other embodiments, the degree of attenuation and delay may be modified depending on the amount of attenuation introduced by the attenuation element 416 and the amount of delay introduced by the delay element 412.

As an advantage to this embodiment and the resulting method of operation, the incoming signal is significantly isolated by the elements 412, 416 and, as discussed below in more detail, the frequency response of the transfer function from node 2 to node 3 modifies the incoming signal. The amount, type, and particulars of the modification to the incoming signal depend on the transfer function. In the example embodiment, a lead-lag response is generated by the attenuator and delay elements to amplify higher frequency portions of and attenuate lower frequency portions of the incoming signal, thereby resulting in high-frequency pre-emphasis. The amount of high-frequency pre-emphasis may be directly proportional to the attenuation factor $\alpha$. This is discussed below in more detail.

As a second advantage to this embodiment and the resulting method of operation, the outgoing (transmit) signal applied to node 1 is not significantly altered by the isolation elements 412A and 416A. The delay element 412A and the attenuation element 416A form an all-pass (i.e. flat magnitude) network. The attenuation of the all-pass network is half the attenuation applied to the incoming signal along path 704, or $10 \cdot \log(1/\alpha)$. Therefore, the attenuation applied to the transmit signal may be inversely proportional to the attenuation factor $\alpha$. The attenuation factor $\alpha$ can be adjusted to produce an optimal balance between high-frequency pre-emphasis of the incoming (receive) signal and attenuation of the outgoing (transmit) signal. For example, on dispersive communication channels such as wireline channels, where high-frequency signals are greatly attenuated, a large attenuation factor $\alpha$ can be used to effect significant high-frequency pre-emphasis of the receive signal with little attenuation of the transmit signal.

A third advantage to this embodiment and the resulting method of operation is the input return loss seen at node 2 is high such that receive signals incident on node 2 are transferred to the isolation circuit with minimal loss. The termination network $R_{term}$ may be selected to match the impedance $Z_{line}$ presented by the channel to produce maximum isolation between transmit and receive signals. Since the current output driver 404 has high output impedance, the impedance seen at node 2 is determined by the termination network $R_{term}$. Thus, the matching of $R_{term}$ and $Z_{line}$ to maximize transmit/receive isolation ensures high input return loss at node 2 and maximum power transfer of incoming signals to the isolation circuit.

With regard to a receive signal proceeding from node 2 to node 3, it is contemplated that all or a majority of the incoming receive signal is isolated from the transmit signal, at node 1. As discussed above, the current output driver 404, or other signal source may be configured with a high output impedance to thereby ensure high input return loss. In other embodiments, a signal source other than a current output driver 404 may be used, which may or may not have a high output impedance, because the transfer functions associated with the isolation circuit ($H_{21}$, $H_{31}$, and $H_{32}$) are independent of the output impedance of the driver. If the output impedance of the driver is not a high impedance, then a portion of the incoming signal that enters at node 2 and travels along the filtered path 704, is reflected back to node 2. The reflected voltage V' is $$V' = V_2(s) \cdot \alpha \cdot e^{-s\tau} \cdot \frac{R_{out} \cdot R_{term}/(R_{out} + R_{term}) - Z_{line}}{R_{out} \cdot R_{term}/(R_{out} + R_{term}) + Z_{line}}$$

$$= V_2(s) \cdot \alpha \cdot e^{-s\tau} \cdot \rho_L$$

Therefore, the voltages at the positive (V+) and negative (V−) terminals of the differencing amplifier 408 are $$V_+ = V_2(s) \cdot (1 + \alpha \cdot e^{-s\tau} \cdot \rho_L)$$

$$V_- = V_2(s) \cdot (1 + \rho_L) \cdot \alpha \cdot e^{-s\tau}$$

and the transfer function from node 2 to node 3 is $$H_{32}(s) = \frac{V_+ - V_-}{V_2(s)} = \frac{V_2(s) \cdot (1 - \alpha \cdot e^{-s\tau})}{V_2(s)}$$

$$= 1 - \alpha \cdot e^{-s\tau}$$

Similarly, it can be shown that $$H_{21}(s) = V_2(s)/I_1(s) = \sqrt{\alpha} \cdot e^{-s\tau/2}$$

$$H_{31}(s) = V_3(s)/I_1(s) = \sqrt{\alpha} \cdot e^{-s\tau/2} \cdot (R_{line}(s) - R_{term}(s))$$

Figure 8:
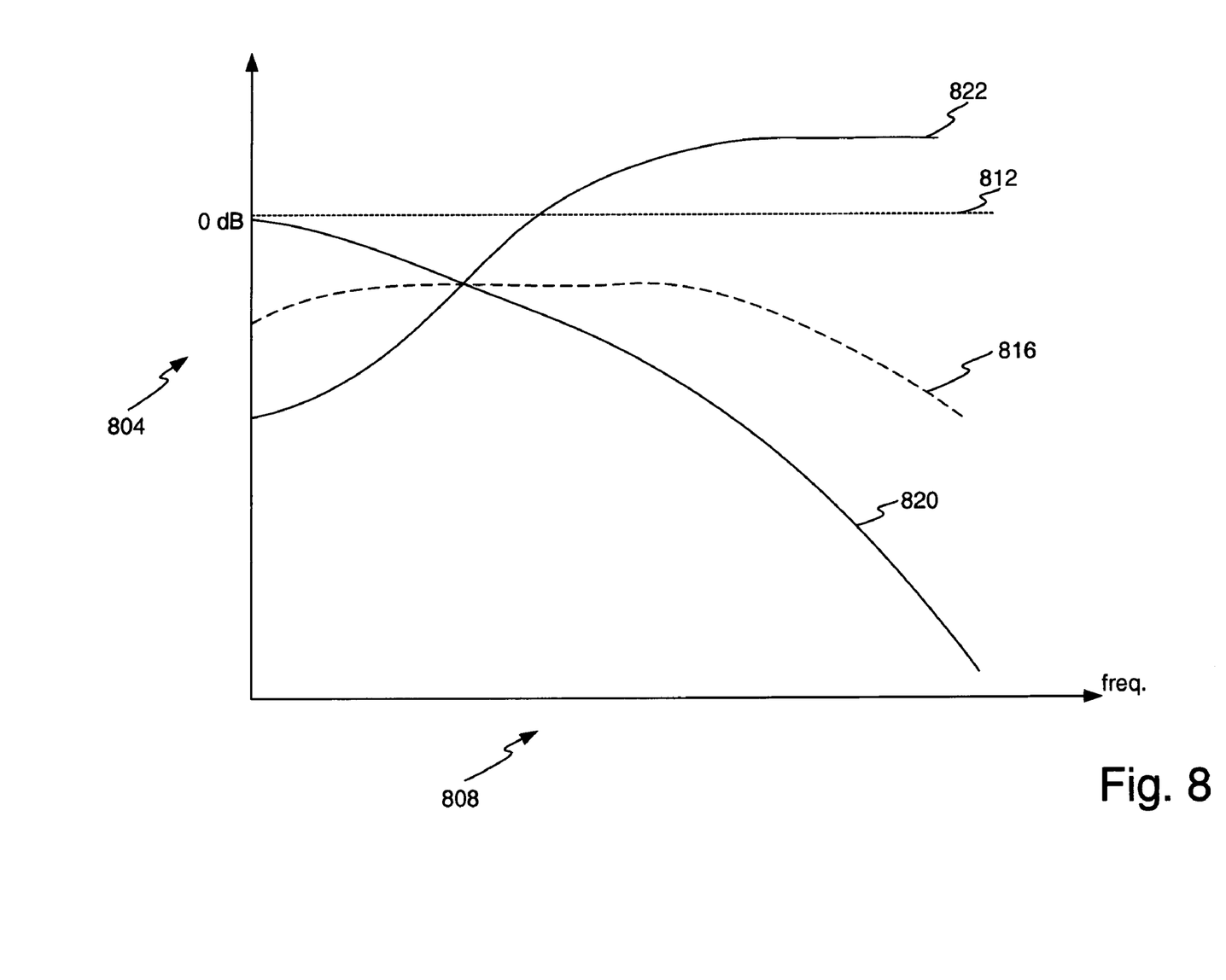
FIG. 8 illustrates a plot of the receive frequency response of a tuned isolation circuit.

FIG. 8 illustrates an exemplary signal plot of an exemplary receive signal frequency response of a tuned hybrid. This should be considered an exemplary plot and is provided for purposes of discussion. Depending the elements within the tuned 20 hybrid, the receive signal frequency response of the tuned hybrid will vary. Thus, by varying the amount of the delay and attenuation it is contemplated that different frequency responses may be obtained. As shown, a vertical axis 804 represents power or magnitude and is shown in dB scale. The horizontal axis 808 represents frequency. A zero dB plot 812 represents the zero dB axis across all frequencies and is provided for reference.

The generally accepted low-pass frequency response of the channel is shown by plot 820. As can be seen, the channel attenuates all frequencies, with higher frequencies being attenuated to a greater degree. The high degree of attenuation of higher frequencies represents a drawback with high frequency communication and is a design challenge that must be overcome to receive and decode a communication signal.

Plot 822 represents the receive signal frequency response of one example embodiment of a tuned hybrid. As can be observed, the receive signal frequency response of the tuned hybrid is configured as a lead-lag type filter response. Thus, at lower frequencies, the tuned hybrid attenuates a received signal, while mid-frequencies experience little attenuation. The tuned hybrid is configured with gain at high frequencies. Thus, portions of the receive signal in the high frequency spectrum are slightly amplified. On low-pass channels, this high-frequency pre-emphasis is highly desirable.

The resulting signal plot 816 represents the combined transfer function of the channel and the tuned hybrid. As can be seen, plot 816 has the benefit of being generally flat across a larger portion of the frequency spectrum of the receive signal. Thus, the tuned hybrid circuit provides the advantage of not only providing isolation and rejection, but also equalizing the channel. As a result, less, or possibly no, equalization may be required within the receiver, or the degree and complexity, of downstream equalization may be reduced. This is an advantage over prior art hybrids that traditionally have an all-pass frequency response with respect to the receive signal.

Figure 9:
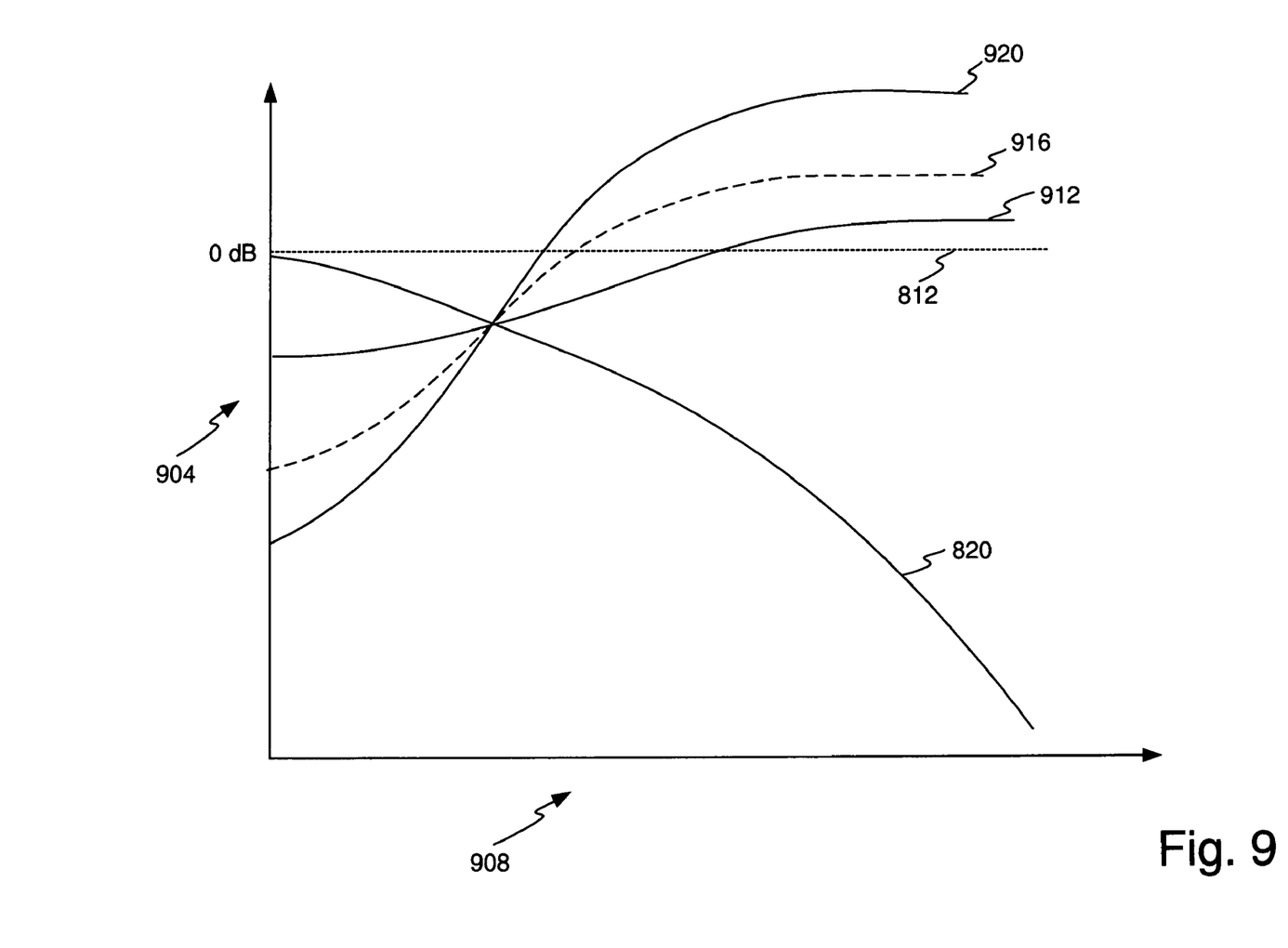
FIG. 9 illustrates a plot of the receive frequency response of a tuned isolation circuit in response to different alpha α values.

FIG. 9 illustrates exemplary signal plots generated in response to varying the value of the attenuation factor α in an exemplary tuned hybrid. This should be considered an exemplary plot and is provided for purposes of discussion. By varying the amount of the delay, attenuation, or both, it is contemplated that a different receive signal frequency response may be obtained. As shown, a vertical axis 904 represents signal power or magnitude and is shown in dB scale. The horizontal axis 908 represents frequency.

A zero dB plot 812 represents the zero dB axis across all frequencies and is provided for reference. The generally accepted frequency response of the channel is shown by plot 820. These plots are discussed above in connection with FIG. 8 and hence are not discussed again.

Plots 912, 916, and 920 represent the receive signal frequency response of the tuned hybrid for different values of attenuation factor α. In particular, plot 920 represents an α value that is larger than the α value associated a tuned hybrid having a frequency response of the other two plots 912, 916. Thus, by selecting a value of α that is larger, the amount of attenuation at low frequencies is increased, while the amount of gain at higher frequencies is also increased. Note that as the value of α increases toward the value of 1, the resulting square root of 1/α results in a number that is closer to the value 1 than 1/α. It is contemplated that a large α value may be selected for a severely low-pass channel, such as a long length of twisted-pair wire cable, because a larger α value provides the advantage of increasing the gain for higher frequencies signal portions, which are greatly attenuated by long lines, while reducing the amount of signal attenuation in the transmit and receive paths of the tuned hybrid circuit.

In contrast, plot 912 is associated with a small attenuation factor α value. As such, the amount of attenuation at low frequencies is lower than compared to plot 920. The amount of gain, as compared to plot 920, is also less. It is contemplated that lower values of α, which yield a frequency response for the tuned hybrid as shown by plot 912, are well suited for less severe low-pass channels, such as a short length of twisted-pair wire cable. For example, on a short length of twisted-pair wire cable the attenuation of the signal, at all frequencies, occurs to a lesser extent than would be experienced on a long length of twisted-pair wire cable. Thus, the smaller α value is well suited in this case because a signal arriving over a less severe low-pass channel does not require as much amplification of the higher frequency components. Plot 916 illustrates a plot of the frequency response of a tuned hybrid having a value of α that is between the value of α that generated plot 920 and the value of α that generated plot 912. It is contemplated that intermediate values for α may be selected to suit a wide range of channel low-pass characteristics. Although exemplary channel low-pass characteristics to α value pairs are provided, it is contemplated that any α value may be selected for a given channel low-pass characteristic, depending on the desired design and operational parameters of the tuned hybrid.

It is further contemplated that the value of α may be permanently set, or adaptable to an ideal value based on the characteristics of the channel. In one embodiment, the receiver may detect the power level or magnitude of a received signal. Based on the power level of the receive signal, the low-pass nature of the channel may be extrapolated, and a value of α selected that is optimized for the channel. In particular, the level of high frequency gain, low frequency attenuation, or both, may be tailored to best suit the detected characteristics of the channel. This operation may occur periodically, as part of an initialization process, or both. In other embodiments, the value of α may be manually set.

Figure 10:
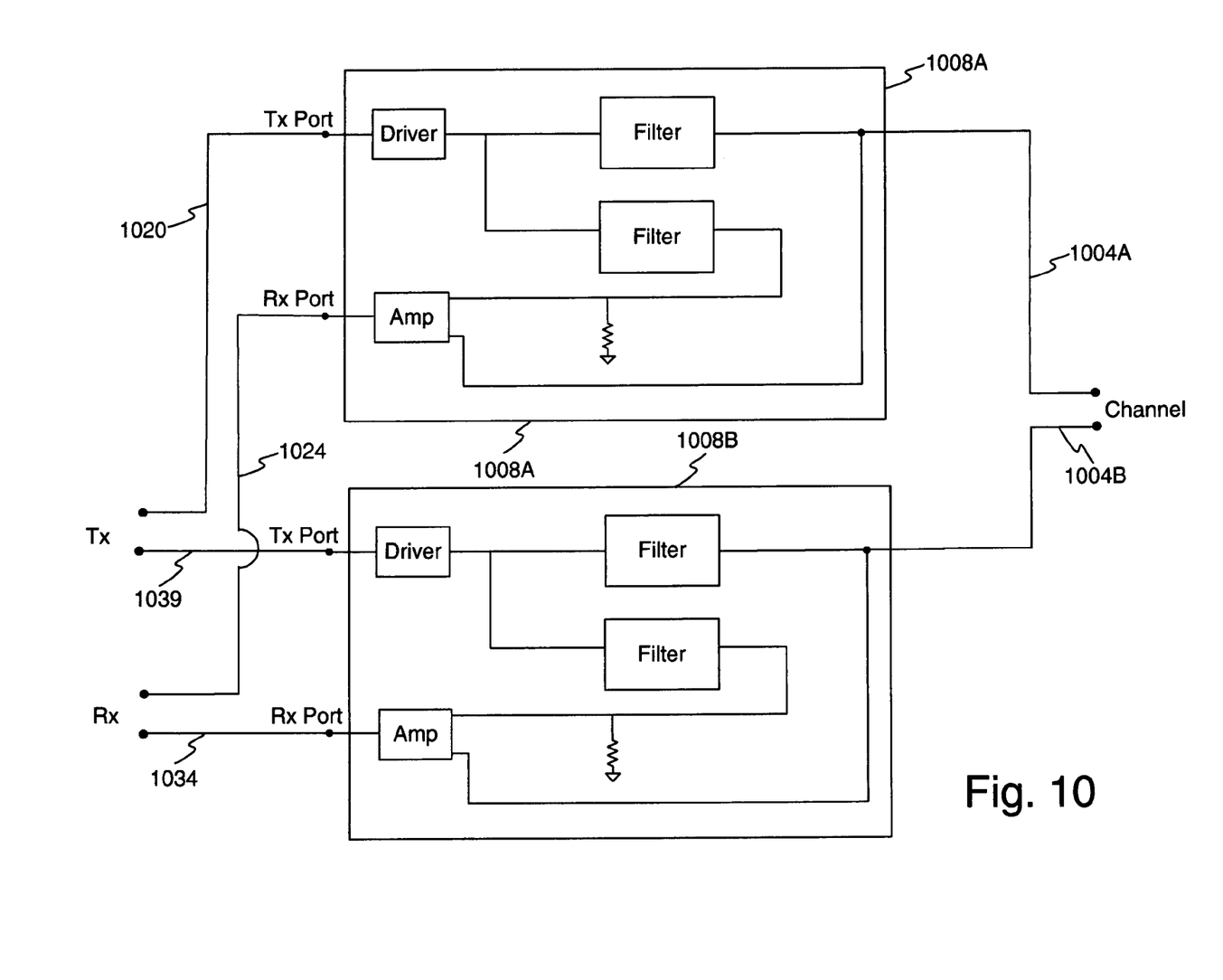
FIG. 10 illustrates a block diagram of an example embodiment of a tuned isolation circuit in a differential mode configuration.

FIG. 10 illustrates a block diagram of an example embodiment of a tuned hybrid in a differential mode configuration. It is contemplated that other configurations for a differential mode tuned hybrid exist and hence, this example embodiment is provided for purposes of discussion. As such, the claims that follow should not be interpreted as being limited to this particular embodiment. In this example embodiment, the channel comprises a twisted pair channel comprising conductors 1004A, 1004B. Numerous tuned hybrids in differential mode configuration may be utilized, such as in a CAT5 Ethernet environment. The conductor 1004A connects to a first tuned hybrid 1008A while the second conductor 1004B connects to a second tuned hybrid 1008B. In other embodiments, other channels may be utilized. In addition, in certain embodiments, a multi-channel communication system may utilize one or more tuned hybrids as described herein.

The first tuned hybrid 1008A and the second tuned hybrid 1008B operate as described above and hence, an explanation of the operation of these devices is not provided again. The first tuned hybrid further comprises a transmit port 1020 and a receive port 1024. Likewise, the second tuned hybrid comprises a transmit port 1039 and a receive port 1034.

The transmit ports 1020, 1039 serve as and/or connect to the two conductor transmit ports associated with a communication device (not shown). The receive ports 1024, 1034 serve as or connect to the two conductor receiver ports that are associated with a communication device (not shown). In other embodiments, more than one two conductor channel may be utilized. For example, some communication systems, such as communication systems that utilize CAT5 cabling utilize more than one channel. It is contemplated that the tuned hybrid described herein may be utilized in such an embodiment. It is further contemplated that a channel with greater than or less than two conductors may be utilized.

While various embodiments of the invention have been described, it will be apparent to those of ordinary skill in the art that many more embodiments and implementations are possible that are within the scope of this invention. In addition, the various embodiments and features may be combined or configured alone or in any combination.

What is claimed is:

1. A method for isolating a received signal using a isolation circuit from a channel also carrying a transmitted signal comprising:
    receiving an incoming signal from a channel at the isolation circuit;
    receiving an outgoing signal at the isolation circuit, the outgoing signal to be sent over the channel;
    filtering the outgoing signal with a first filter to create a first filtered outgoing signal;
    filtering the outgoing signal with a second filter to create a second filtered outgoing signal;
    providing the first filtered outgoing signal and the second filtered outgoing signal to a differencing amplifier;
    filtering the incoming signal with the first filter and the second filter to create a filtered incoming signal;
    providing the filtered incoming signal and the incoming signal to a differencing amplifier; and
    outputting the incoming signal from the differencing amplifier, wherein the first filtered outgoing signal and the second filtered outgoing signal cancel in the differencing amplifier.

2. The method of claim 1, wherein the first filter and the second filter have a generally identical frequency response.

3. The method of claim 1, wherein filtering comprises delaying and attenuating.

4. The method of claim 1, wherein filtering comprises all-pass response filtering.

5. The method of claim 1, wherein the channel comprises one or more twisted pair conductors.

6. The method of claim 1, wherein the first filter and the second filter are configured to generate a frequency response for the isolation circuit with high-frequency pre-emphasis.

7. A method for isolating a transmit port and a receive port to maintain a desired level of electrical isolation between a signal on the transmit port and an incoming signal received on the receive port in a shared channel environment, the method comprising:
    receiving an incoming signal at a channel node from a channel;
    providing an outgoing signal to a transmit port;
    processing the incoming signal to thereby attenuate lower frequency portions of the incoming signal and amplify higher frequency portions of the incoming signal, to thereby create a processed incoming signal;
    processing the outgoing signal to generate two or more generally equal outgoing signals;
    providing the processed incoming signal and the incoming signal to a summing device; and
    providing the two or more generally equally processed outgoing signal to a summing device, wherein the generally equal outgoing signals cancel in the summing device and the summing device outputs the incoming signal.

8. The method of claim 7, wherein the summing device comprises a differential amplifier.

9. The method of claim 7, wherein processing the outgoing signal comprises:
    performing first processing on the outgoing signal;
    performing second processing on the outgoing signal.

10. The method of claim 7, wherein the channel comprises a twisted pair conductor.

11. The method of claim 7, wherein the processing is performed by one or more filters.

12. The method of claim 11, wherein at least one of the one or more filters comprises an attenuator and a delay.

13. A isolation circuit comprising:
    a channel port;
    a transmit port;
    a receive port;
    a first filter connected to the channel port;
    a second filter;
    a signal source connected to the transmit port, the first filter, and the second filter; and
    a summing junction connected to the receive port, the channel port, and the second filter.

14. The isolation circuit of claim 13, further comprising a termination impedance, connected to the channel port, configured to match the impedance of the channel.

15. The isolation circuit of claim 13, wherein the first filter and the second filter each comprise a delay and an attenuator.

16. The isolation circuit of claim 15, wherein the attenuator comprises one or more resistors.

17. The isolation circuit of claim 13, wherein the frequency response of the hybrid comprises a frequency response with high-frequency pre-emphasis.

18. A signal isolation unit comprising:
    a channel port configured to connect to a channel;
    a transmit port configured to connect to a transmitter;
    a receive port configured to connect to a receiver;
    a differencing amplifier comprising:
        an output connected to the receiver port
        a first input connected to the channel port;
        a second input connected to a second filter;
    a current-mode driver comprising an input connected to the transmit port and an output connected to the first filter and a second filter;
    wherein the first filter connects to the channel port and the first filter and the second filter have generally similar transfer functions.

19. The unit of claim 18, wherein the transfer function of the signal isolation unit is frequency dependant.

20. The unit of claim 18, wherein the transfer function of the signal isolation unit is other than an all-pass filter.

21. The unit of claim 18, further comprising a termination impedance.

22. The unit of claim 18, wherein the signal isolation unit is configured in a differential mode.

23. The unit of claim 18, wherein each input of the differencing amplifier receives a generally identical filtered version of a signal received on the transmit port.

* * * * *